(12) United States Patent
Thielert

(10) Patent No.: US 8,012,441 B2
(45) Date of Patent: Sep. 6, 2011

(54) METHOD FOR ISOLATING HYDROGEN SULPHIDE FROM COKE OVEN GAS WITH THE SUBSEQUENT RECOVERY OF ELEMENTAL SULPHUR IN A CLAUS PLANT

(75) Inventor: Holger Thielert, Dortmund (DE)

(73) Assignee: Uhde GmbH, Dortmund (DE)

( * ) Notice: Subject to any disclaimer, the term of this patent is extended or adjusted under 35 U.S.C. 154(b) by 1340 days.

(21) Appl. No.: 10/521,984

(22) PCT Filed: May 10, 2003

(86) PCT No.: PCT/EP03/04899
§ 371 (c)(1), (2), (4) Date: Aug. 18, 2005

(87) PCT Pub. No.: WO2004/014792
PCT Pub. Date: Feb. 19, 2004

(65) Prior Publication Data
US 2006/0099124 A1  May 11, 2006

(30) Foreign Application Priority Data
Jul. 25, 2002 (DE) .................................. 102 33 819

(51) Int. Cl.
*B01D 53/14* (2006.01)
(52) U.S. Cl. ....... 423/242.1; 95/235; 423/511; 423/563; 423/573.1; 423/224
(58) Field of Classification Search ............ 95/235; 423/242.1, 511, 561.1, 573.1
See application file for complete search history.

(56) References Cited

U.S. PATENT DOCUMENTS 2,365,893 A * 12/1944 Mather et al. ................... 208/74
2,534,792 A * 12/1950 Nevins et al. ................. 422/109
3,607,132 A *  9/1971 Sudduth ....................... 422/171
(Continued)

FOREIGN PATENT DOCUMENTS
DE      37 08 957       10/1988
(Continued)

OTHER PUBLICATIONS

*Ullmanns Encyclopedia of Technical Chemistry*, vol. 21, pp. 8 to 13, 1996.
(Continued)

*Primary Examiner* — Duane Smith
*Assistant Examiner* — Ives Wu
(74) *Attorney, Agent, or Firm* — Collard & Roe, P.C.

(57) ABSTRACT

The invention relates to a method for isolating hydrogen sulphide from coke-oven gas with the subsequent recovery of elemental sulphur in a Claus plant. The hydrogen sulphide is eliminated from the coke-oven gas by gas washing using an absorption liquid. During the regeneration of the loaded absorption liquid, hydrogen sulphide is accumulated in concentrated form and is fed to the Claus plant. Said Claus plant comprises a Claus boiler, a waste-heat boiler, in addition to a reactor, which forms an additional catalyst stage. According to the invention, the Claus plant is operated with a single reactor, which operates at a working temperature of below 250° C. The process gas that exits the reactor is returned after the deposition of elemental sulphur with a non-reacted residual concentration of hydrogen sulphide to the coke-oven gas that is to be cleaned, prior to the gas washing stage.

4 Claims, 2 Drawing Sheets

U.S. PATENT DOCUMENTS

| | | | | |
|---|---|---|---|---|
| 3,767,766 A | * | 10/1973 | Tjoa et al. | 423/220 |
| 3,994,669 A | * | 11/1976 | Meenan | 431/165 |
| 4,124,685 A | * | 11/1978 | Tarhan et al. | 423/574.2 |
| 4,155,990 A | * | 5/1979 | Kimura et al. | 423/574.1 |
| 4,198,386 A | * | 4/1980 | Laslo et al. | 423/574.1 |
| 4,501,725 A | | 2/1985 | Lell | |
| 4,507,275 A | * | 3/1985 | Reed | 423/574.1 |
| 4,597,788 A | | 7/1986 | Apffel | |
| 4,741,515 A | * | 5/1988 | Sharma et al. | 266/266 |
| 4,940,081 A | * | 7/1990 | Hyde | 165/9.1 |
| 5,100,640 A | | 3/1992 | Dittmer et al. | |
| 5,137,602 A | | 8/1992 | Stewen et al. | |
| 5,169,604 A | * | 12/1992 | Crothers, Jr. | 422/177 |
| 5,628,977 A | * | 5/1997 | Heisel et al. | 423/573.1 |
| 5,676,921 A | * | 10/1997 | Heisel et al. | 423/573.1 |
| 5,845,610 A | * | 12/1998 | Hatta et al. | 122/510 |
| 5,935,277 A | * | 8/1999 | Autenrieth et al. | 48/127.9 |
| 6,280,609 B1 | * | 8/2001 | Vora et al. | 208/152 |
| 6,508,998 B1 | * | 1/2003 | Nasato | 423/573.1 |
| 7,036,461 B2 | * | 5/2006 | Thielert et al. | 122/7 R |
| 7,244,405 B2 | * | 7/2007 | Thielert | 423/237 |
| 2002/0134706 A1 | * | 9/2002 | Keller et al. | 208/250 |

FOREIGN PATENT DOCUMENTS

| | | |
|---|---|---|
| DE | 38 43 295 | 6/1990 |
| EP | 0 672 618 | 9/1995 |
| EP | 0 811 417 | 12/1997 |
| GB | 769995 | 3/1957 |
| GB | 2221853 A * | 2/1988 |
| GB | 2221853 A * | 2/1990 |
| GB | 2221853 A * | 2/1990 |
| WO | WO 01/09032 | 2/2001 |
| WO | WO 01/30692 | 5/2001 |

OTHER PUBLICATIONS

International Search Report.
English translation of the International Preliminary Examination Report.

* cited by examiner

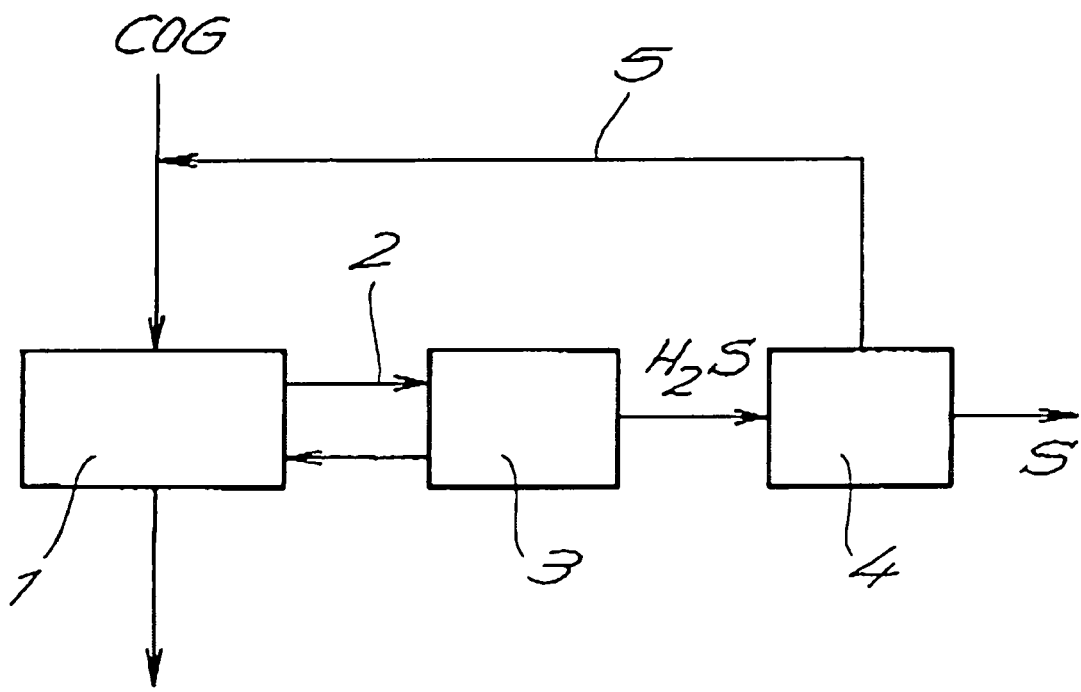

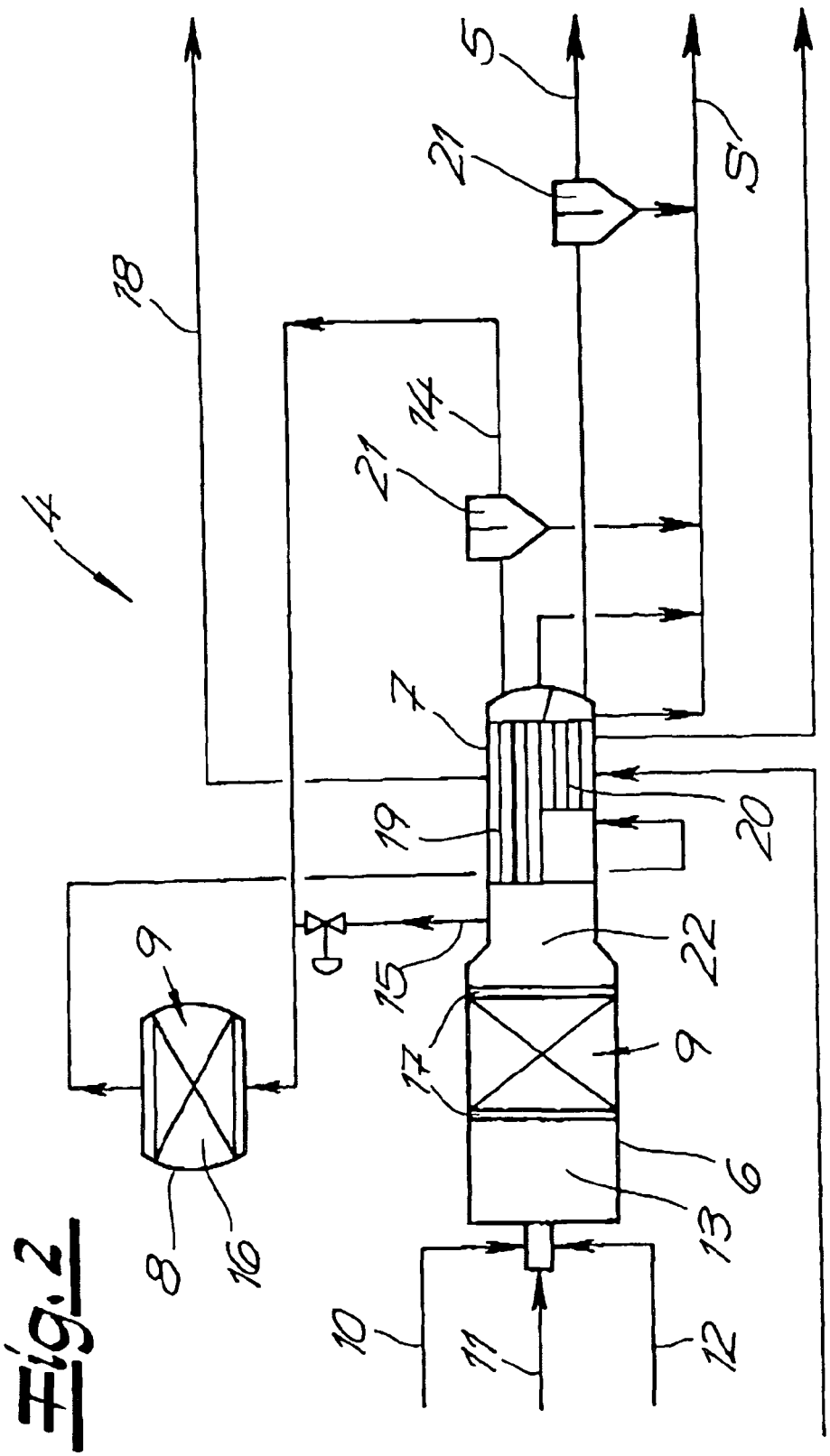

METHOD FOR ISOLATING HYDROGEN SULPHIDE FROM COKE OVEN GAS WITH THE SUBSEQUENT RECOVERY OF ELEMENTAL SULPHUR IN A CLAUS PLANT

CROSS REFERENCE TO RELATED APPLICATIONS

Applicant claims priority under 35 U.S.C. §119 of German Application No. 102 33 819.1 filed Jul. 25, 2002. Applicant also claims priority under 35 U.S.C. §365 of International Application No. PCT/EP2003/004899 filed on May 10, 2003. The international application under PCT article 21 (2) was not published in English.

The invention relates to a method for isolating hydrogen sulfide from coke oven gas with subsequent recovery of elemental sulfur in a Claus plant, in which the hydrogen sulfide is removed from the coke oven gas by means of gas scrubbing, using an absorption liquid, the charged absorption liquid is regenerated and, in this connection, hydrogen sulfide that accumulates in concentrated form is passed to the Claus plant, wherein the hydrogen sulfide is reacted with oxygen in the air, in a Claus boiler of the Claus plant, forming elemental sulfur, wherein the process gas that leaves the Claus boiler is cooled to the temperature required for condensation of the sulfur, in a waste heat boiler, heated after the sulfur has been precipitated, and passed to a reaction oven of the Claus plant, in which sulfur compounds are converted to elemental sulfur on a catalyst, and wherein the process gas that leaves the reaction oven is cooled to a temperature required for condensation of the sulfur, and the condensed sulfur is precipitated.

Coke oven gas contains hydrogen sulfide, which must be removed before use in a gas scrubber. In the regeneration of the charged absorption liquid used for gas scrubbing, hydrogen sulfide occurs in concentrated form, and is converted to elemental sulfur in a subsequent Claus plant. The core piece of the Claus plant is a boiler having a combustion chamber, where hydrogen sulfide is converted to elemental sulfur with oxygen, at high temperatures of more than 800° C. The basic reaction of the process is

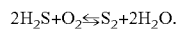
$$2H_2S + O_2 \leftrightarrows S_2 + 2H_2O.$$

The reaction is greatly exothermic and therefore very temperature-dependent. In accordance with the reaction equilibrium, about 70% of the hydrogen sulfide converts to elemental sulfur, which is precipitated by means of cooling of the process gas in a subsequent waste heat boiler, by means of condensation. In subsequent reaction ovens, which are also referred to as catalyst stages, residual contents of hydrogen sulfide and sulfur dioxide are converted to sulfur on catalysts, in accordance with the reaction equation

$$3H_2S + SO_2 \leftrightarrows \tfrac{3}{8}S_8 + 2H_2O.$$

The Claus reactors are operated at temperatures below 350° C. Within the framework of the known measures, the Claus plant is always configured with at least two Claus reactors, switched in series and operated at different temperatures, in order to achieve high sulfur yields. Between the Claus reactors switched in series, an intermediate cooling is provided, for the precipitation of elemental sulfur. A Claus plant having the structure described and having the purpose of use indicated is described in Ullmanns Encyklopädie der technischen Chemie [Ullmann's Encyclopedia of Technical Chemistry], Vol. 21, pages 8 to 13.

A Claus plant consisting of a Claus boiler and two subsequent catalyst stages with intermediate cooling systems is complicated in terms of apparatus. The invention is based on the task of reducing the apparatus expenditure by means of modifying the method.

Proceeding from the method described initially, the task is accomplished, according to the invention, in that the Claus plant is operated with only a single reaction oven, and that a working temperature of less than 250° C. is set in this oven, and that the process gas that leaves the reaction oven, after precipitation of the condensed sulfur, is passed back into the coke oven gas to be cleaned, ahead of the gas scrubbing, with a residual content of hydrogen sulfide that was not converted in the reaction oven. Preferably, the reaction oven is operated in a temperature range between 200° C. and 230° C.

According to the invention, the Claus plant is configured only with a Claus boiler and a single subsequent catalyst stage, which is operated at a lower temperature, in comparison with the state of the art. In this connection, it is accepted that the converted part of $H_2S$, with reference to the hydrogen sulfide amount passed to the Claus plant, is less than in the state of the art, when using a Claus plant having two or more catalyst stages. According to the invention, it was recognized, when considering the process as a whole, that higher sulfur contents in the waste gas of the Claus plant are tolerable if the waste gas is passed back to the coke oven gas to be cleaned, and subjected to gas scrubbing together with it. The gas scrubbing is designed in such a manner that a higher content of hydrogen sulfide in the coke oven gas has no effect on the hydrogen sulfide content in the cleaned gas. In this regard, the gas scrubbing makes a second or third catalyst stage of the Claus plant superfluous. By means of the method according to the invention, the Claus plant can be configured in very simple manner, in terms of system technology. The control technology side of the Claus plant is also significantly simplified.

Further embodiments of the method according to the invention are described in the dependent claims 3 to 6, and are explained in the following, using an exemplary embodiment. The figures schematically show FIG. 1 a greatly simplified block schematic of the method according to the invention, FIG. 2 a Claus plant that is used within the scope of the method according to the invention.

According to the method shown in FIG. 1 in the form of a block schematic, hydrogen sulfide is separated from coke oven gas COG and converted to elemental sulfur S in a subsequent Claus plant. The hydrogen sulfide is removed from coke oven gas by means of gas scrubbing 1 using an absorption liquid. The charged absorption liquid 2 is regenerated in a stage 3. In this connection, hydrogen sulfide occurs in concentrated form, in the form of vapor, which is passed to a Claus plant 4. In the Claus plant 4, hydrogen sulfide is converted to elemental sulfur S, which is drawn off in liquid form. Furthermore, a process gas 5 occurs, which contains a non-reacted residual content of hydrogen sulfide and is passed back to the coke oven gas COG to be cleaned, ahead of the gas scrubbing 1.

The structure of the Claus plant 4 is shown in FIG. 2. The fundamental structure of this plant includes a Claus boiler 6, a waste heat boiler 7, as well as a reaction oven 8 having a catalyst bulk material 9. An application stream 10 that contains hydrogen sulfide is fed into a combustion chamber 13 of the Claus boiler 6, together with air 11 and heating gas 12, and converted at temperatures of approximately 1200° C., in an exothermic reaction, forming elemental sulfur. The process gas that leaves the Claus boiler 6 is cooled to a temperature of less than 170° C., which is required for condensation of the sulfur, in the waste heat boiler 7. Elemental sulfur S is condensed and precipitated. After precipitation of the sulfur, the process gas 14 is heated, by mixing in a partial stream 15 that is taken from the Claus boiler 6, and passed to the reaction oven 8 of the Claus plant. In the reaction oven 8, hydrogen sulfide and sulfur dioxide are converted to elemental sulfur on catalysts 16. The reaction oven 8 is operated at a working temperature of less than 250° C., preferably in a temperature range between 200° C. and 230° C.

From FIG. 2, it is evident that the Claus plant 4 is configured with only a single reaction oven 8. The process gas that leaves the reaction oven 8 is cooled to a temperature required for condensation of the sulfur. After precipitation of the condensed sulfur, the process gas 5, which still contains a residual content of hydrogen sulfide, is passed back into the coke oven gas COG to be cleaned, ahead of the gas scrubbing 1. According to a preferred embodiment of the method according to the invention, the Claus plant 4 is operated in such a manner that 80 to 85% of the hydrogen sulfide is converted to elemental sulfur and drawn off as a condensate.

A boiler lined with a refractory material, lying horizontally, is used as the Claus boiler 6, which has a combustion chamber 13 and a catalyst chamber having a catalyst bulk material 9, which follows horizontally and is delimited on both sides by gas-permeable checker bricks 17.

In the waste heat boiler 7, both the gas stream that exits from the Claus boiler 6, having a temperature of about 1200° C., and the process gas stream that exits from the reaction oven 8, having a temperature of less than 250° C., are cooled to a temperature below the condensation temperature of elemental sulfur. In this connection, a low-tension steam 18 is generated. The waste heat boiler 7 has a first tube bundle 19 composed of heat exchanger tubes, through which the process gas that exits from the Claus boiler 6 flows. The waste heat boiler 7 furthermore has a second tube bundle 20 composed of heat exchanger tubes, through which the process gas that exits from the reaction oven 8 flows. The tube bundles 19, 20 are disposed in a common steam generator chamber. Elemental sulfur already condenses in the waste heat boiler 7 and is drawn off from the waste heat boiler 7 and subsequent precipitators 21 in liquid form.

To heat the process gas 14 passed to the reaction oven 8, a partial stream 15 is branched out of the Claus boiler. The branch line is connected to the circumference of a downstream-side chamber 22 of the Claus boiler 6, which chamber is lined with refractory material, and opens into the process gas line that is adjacent to the boiler. In the orifice region of the branch line, a valve body is disposed in adjustable manner, with which the amount flow of the gas stream that exits from the branch line can be regulated. The valve body and a setting device assigned to the valve body are cooled by the process gas 14 that is passed through the process gas line, so that usual metallic components can be used for the valve body.

The invention claimed is:

1. Method for isolating hydrogen sulfide from coke oven gas with subsequent recovery of elemental sulfur in a Claus plant, in which the hydrogen sulfide is removed from the coke oven gas by means of gas scrubbing, using an absorption liquid, the charged absorption liquid is regenerated and, in this connection, hydrogen sulfide that accumulates in concentrated form is passed to the Claus plant, wherein the hydrogen sulfide is reacted with oxygen in the air, in a Claus boiler of the Claus plant, forming elemental sulfur, wherein the process gas that leaves the Claus boiler is cooled to the temperature required for condensation of the sulfur, in a waste heat boiler, heated after the sulfur has been precipitated, and passed to a reaction oven of the Claus plant, in which sulfur compounds are converted to elemental sulfur on a catalyst, and wherein the process gas that leaves the reaction oven is cooled to a temperature required for condensation of the sulfur, and the condensed sulfur is precipitated, wherein the Claus plant is operated with only a single reaction oven in such a manner that 80% to 85% of the hydrogen sulfide is converted to elemental sulfur and drawn off as a condensate, wherein the single reaction oven is operated in a temperature range between 200° C. and less than 230° C., and wherein the process gas that leaves the reaction oven, after precipitation of the condensed sulfur, is passed back into the coke oven gas to be cleaned, ahead of gas scrubbing, with a residual content of hydrogen sulfide that was not converted in the single reaction oven, and wherein a boiler lined with a refractory material, lying horizontally, is used as the Claus boiler, which has a combustion chamber and a catalyst chamber having a catalyst bulk material, which follows horizontally and is delimited on both sides by gas-permeable checker bricks.

2. Method as claimed in claim 1, wherein the waste heat boiler has a first tube bundle composed of heat exchanger tubes, through which the process gas that exits from the Claus boiler flows, wherein the waste heat boiler has a second tube bundle composed of heat exchanger tubes, through which the process gas that exits from the reaction oven flows, and wherein the tube bundles are disposed in a common steam generator chamber, in which low-tension steam is generated.

3. Method as claimed in claim 1, wherein elemental sulfur is drawn off from the waste heat boiler in liquid form.

4. Method as claimed in claim 1, wherein a partial stream is branched out of the hot process gas that leaves the Claus boiler, and mixed into the process stream that is passed to the reaction oven, to heat it.

\* \* \* \* \*